(12) United States Patent
Goetz

(10) Patent No.: US 9,541,139 B2
(45) Date of Patent: Jan. 10, 2017

(54) CLUTCH

(71) Applicant: Schaeffler Technologies AG & Co. KG, Herzogenaurach (DE)

(72) Inventor: Andreas Goetz, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/440,807

(22) PCT Filed: Nov. 29, 2013

(86) PCT No.: PCT/DE2013/200331
§ 371 (c)(1),
(2) Date: May 5, 2015

(87) PCT Pub. No.: WO2014/094764
PCT Pub. Date: Jun. 26, 2014

(65) Prior Publication Data
US 2015/0275984 A1      Oct. 1, 2015

(30) Foreign Application Priority Data
Dec. 17, 2012   (DE) .......................... 10 2012 223 386

(51) Int. Cl.
*F16D 13/52*     (2006.01)
*F16D 25/0638*   (2006.01)
*F16D 13/68*     (2006.01)
*F16D 27/115*    (2006.01)

(52) U.S. Cl.
CPC ............ *F16D 13/686* (2013.01); *F16D 13/52* (2013.01); *F16D 13/683* (2013.01); *F16D 25/0638* (2013.01); *F16D 27/115* (2013.01)

(58) Field of Classification Search
CPC ................................ F16D 13/42; F16D 13/686
See application file for complete search history.

(56) References Cited

U.S. PATENT DOCUMENTS 2,324,613 A * 7/1943 Criley ..................... F16D 13/52
                                              192/111.15
3,871,499 A * 3/1975 Kazuma ................ F16D 13/385
                                              192/70.18
(Continued)

FOREIGN PATENT DOCUMENTS

CN              1129295          8/1996
CN              201125971        10/2008
(Continued)

*Primary Examiner* — Robert A Siconolfi
*Assistant Examiner* — Ryan Dodd
(74) *Attorney, Agent, or Firm* — Simpson & Simpson, PLLC

(57) ABSTRACT

A clutch comprises an input side and an output side, which are disposed rotatably. First frictional partners are non-rotatably connected with the input side and axially movable and second frictional partners are non-rotatably connected with the output side and axially movable. Furthermore, a compression device is provided to compress the frictional partners axially, in order to provide a torsional connection between the input side and the output side. Both sides are decoupled axially from the respective frictional partners with which they are engaged.

8 Claims, 4 Drawing Sheets

(56) References Cited

U.S. PATENT DOCUMENTS

| | | | | |
|---|---|---|---|---|
| 4,664,240 A | * | 5/1987 | Majima | F16D 25/082 |
| | | | | 192/85.49 |
| 4,802,564 A | * | 2/1989 | Stodt | F16D 13/52 |
| | | | | 188/71.5 |
| 5,080,212 A | * | 1/1992 | Flotow | F16D 13/385 |
| | | | | 192/111.4 |
| 2012/0061203 A1 | | 3/2012 | Harmon et al. | |

FOREIGN PATENT DOCUMENTS

| | | |
|---|---|---|
| CN | 102022448 | 4/2011 |
| CN | 102549287 | 7/2012 |
| DE | 102009059943 | 7/2010 |
| EP | 2387673 | 11/2011 |
| WO | WO2009105861 | 9/2009 |

* cited by examiner

CLUTCH

CROSS-REFERENCE TO RELATED APPLICATIONS

The present application is the U.S. national stage application pursuant to 35 U.S.C. §371 of International Application No. PCT/DE2013/200331, filed on Nov. 29, 2013, which application claims priority from German Patent Application No. DE 10 2012 223 386.5, filed on Dec. 17, 2012, which applications are incorporated herein by reference in their entireties.

FIELD OF THE INVENTION

The present invention relates generally to a clutch, and, more specifically, to a friction clutch for transmitting torque in a drivetrain of a motor vehicle.

BACKGROUND OF THE INVENTION

A clutch, in particular a multiple plate wet clutch, generally includes an input component and an output component, which are supported coaxially to each other so that they can rotate with respect to each other. A first set of frictional elements are non-rotatably connected to the input component and are capable of being axially displaced. Similarly, a second set of frictional elements are non-rotatably connected to the output component and are also typically capable of being axially displaced. Typically, the frictional elements of the first set are disposed alternately with the frictional elements of the second set in the axial direction. A compression device axially compresses the structure of first and second frictional components and the first set of frictional elements frictionally engage the second set of frictional elements. Depending on the degree of compression, a partial or complete transmission of torque between the input and output components is achieved in this way. Typically, a clutch of this sort can be placed in a drivetrain before or after the transmission, in particular a dual-clutch transmission. The clutch can be used for selectively interrupting a flow of torque during a gear change by forming a partial or complete connection between the input and output components.

A tooth arrangement is typically used for the torsional support of the frictional partners on their respective sides, such that the frictional partners are axially movable. If the clutch is only partially engaged, then the torque transmitted between the frictional partners brings about a relative rotation of the frictional partners relative to the tooth arrangement of the sides assigned to them. This rotation exerts a force operating in a circumferential direction, which puts a strain on the tooth arrangement of the frictional partners, so that the movability of the frictional partners in the tooth arrangement may be made more difficult. The greater the transmitted torque, the more severely the frictional partners tend to stick to the tooth arrangement and resist axial movement. In a normal stack of first and second frictional partners, under a load provided on one side by the compression device, the force operating axially on one frictional partner may therefore decrease as its distance from the actuating side increases.

This loss of axial force may lead to torque hysteresis, which may make it difficult to precisely control the torque transmissible by means of the clutch. A connection between the axial force exerted by the compression device and a rate of transmission of torque by the clutch can depend on a prehistory of the actuation, in particular on whether an increasing or decreasing compression force is affected.

If the clutch is part of a drivetrain of a motor vehicle, then this may detract from precise gear changing and gentle acceleration with minimum jerking. The object of the invention is therefore to specify a clutch which realizes improved controllability by reducing torque hysteresis.

BRIEF SUMMARY OF THE INVENTION

The present invention comprises a clutch having an input side, an output side disposed rotatably to the input side, first frictional partners axially movable and non-rotatably connected to the input side, second frictional partners axially movable and non-rotatably connected to the output side, and, a compression device arranged to compress the first and second frictional partners axially, providing a non-rotatable connection between the input side and the output side, wherein, the input side decouples axially from the first frictional partners and the output side decouples axially from the second frictional partners.

In contrast to a known solution in which the structure of frictional partners is compressed axially against the input side or against the output side, the axial forces of the described compression device may be distributed more uniformly between the frictional partners. This makes it possible to reduce a loss of axial force for a frictional partner as the distance from the side actuated by the compression device increases. Together with the loss of axial force, it is also possible to reduce a hysteresis behavior which may be observed between the axial force exerted by the compression device and the torque that is transmissible by means of the clutch. The torque transmissible by means of the clutch can be better controlled by means of the axial force. In a drivetrain, a transmitted torque can be better controlled by means of the clutch. If the drivetrain serves to propel a motor vehicle, then acceleration or deceleration of the motor vehicle can be better controlled by means of the drivetrain.

In an example embodiment, the sides, i.e. the input side and the output side, are decoupled in such a way that the compressed frictional partners are jointly movable axially in relation to the input side and the output side. This enables an especially uniform distribution of axial forces between the individual frictional partners. In theory, it is possible to halve the loss of axial force and of the hysteresis behavior.

In an example embodiment, the decoupling of one of the sides occurs by means of an axially elastic element, which is set up to transmit the torque that is transmissible by means of the clutch. This makes it possible to combine a simple and efficient axial decoupling with an equally simple and efficient radial or axial transmission of torque.

In an example embodiment, the axially elastic element comprises a diaphragm spring. The diaphragm spring can represent an economical and stable embodiment of the axially elastic element. The transmission behavior of the diaphragm spring for torque can be especially good here.

In an example embodiment, the elasticity of the axially elastic element is much greater than that of the frictional partners. By preference, the elasticity can be at least around twice as great, preferably at least around five times as great. The distribution of axial forces between the individual frictional partners can thus be dependent to a greatly reduced extent on an axial flexibility or elasticity of the individual frictional partners. The described hysteresis effect can be further reducible thereby.

The decoupling of one of the sides can also occur by means of a bearing which is movable in an axial direction. By preference, the design of this bearing is integrated with the compression device.

In an example embodiment, the compression device includes a hydraulic actuator, which operates axially on the frictional partners. The axial movability of the structure of frictional partners can be designed to integrate with a hydraulic compression device. This can provide operating and cost benefits.

In an example embodiment, the compression device also includes another hydraulic actuation system, which acts on the structure of frictional partners antiparallel to the first hydraulic actuation system. In this way, an axial position of the arrangement can adjust itself especially well during the axial actuation, so that the distribution of axial forces onto the individual frictional partners can be accomplished especially uniformly.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION OF THE INVENTION

Figure 1:
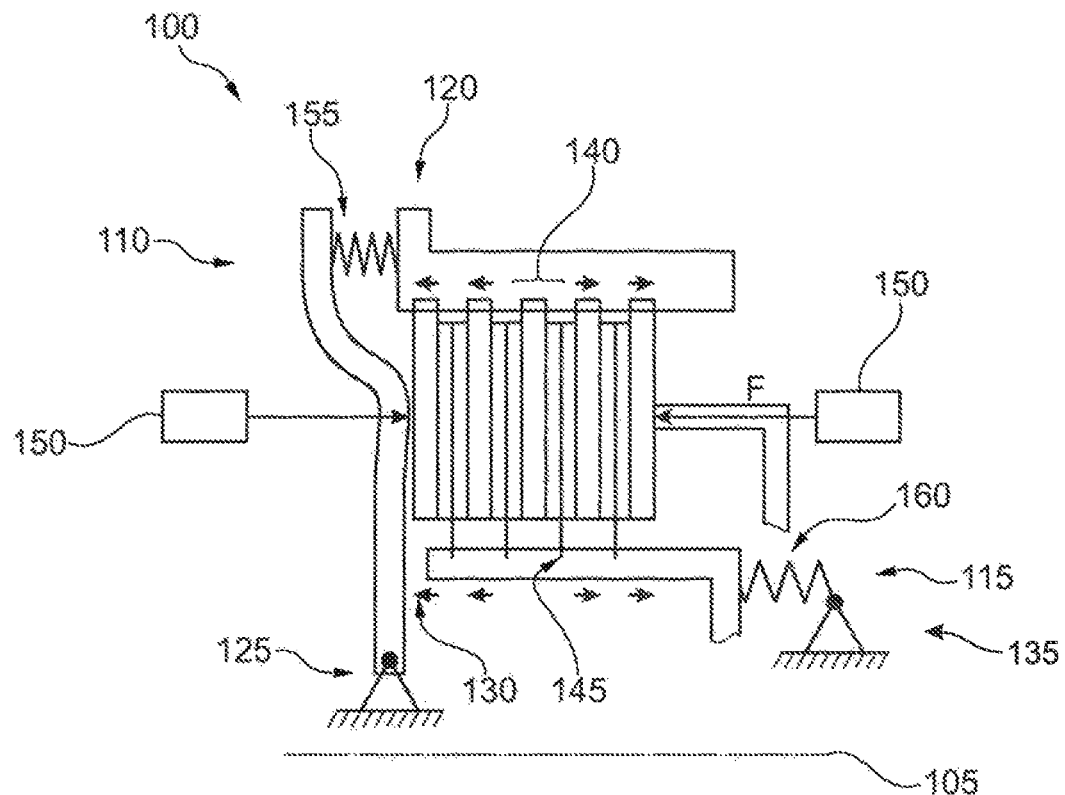
FIG. 1 is a schematic view of an exemplary embodiment of a clutch, according to the present invention.

At the outset, it should be appreciated that like reference characters on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1 is a schematic depiction of clutch 100 which is designed as a multiple plate clutch, preferably for operation in a fluid medium such as oil. Disposed coaxially and rotatably around axis of rotation 105 are input side 110 and output side 115. It should be understood that the designations of input side 110 and output side 115 are generally interchangeable. Input side 110 includes outer basket 120, which is designed in a single piece in known constructions, and first radial bearing 125. In a comparable way, output side 115 includes inner basket 130, which is likewise designed in a single piece in known constructions, and second radial bearing 135.

First frictional partners 140 are connected axially movably and non-rotatably to outer basket 120 of input side 110. The transmission of force between first frictional partners 140 and outer basket 120 usually occurs by means of toothing, whose teeth run in an axial direction. In a corresponding way, second frictional partners 145 are connected axially movably and non-rotatably to inner basket 130 of output side 115. Here too, the transmission of torque between the second frictional partners and the inner basket 130 preferably occurs by means of axially running toothing.

First frictional partners 140 and second frictional partners 145 are preferably arranged alternately in an axial direction. Compression device 150 is set up to compress the structure of first frictional partners 140 and second frictional partners 145 axially, in order to bring about dynamic or static friction at the contact surfaces between first frictional partners 140 and second frictional partners 145, so that torque can be conveyed between input side 110 and output side 115 through frictional partners 140 and 145.

In customary designs, compression device 150 is designed so that it presses one axial end of the structure of frictional partners 140 and 145 against an axial delimitation of one of sides 110 or 115, in the depiction of FIG. 1 for example a radially running section of the outer basket 120. If clutch 100 is engaged, as the compression force of compression device 150 increases, frictional partners 140 and 145 are pushed against one another axially to an increasing extent so that they move in small increments along the toothing of outer basket 120 or inner basket 130.

However, the torque transmitted by means of clutch 100 causes friction in the area of the toothing of frictional partners 140 and 145, so that the axial movement of frictional partners 140, 145 cannot be passed along completely to a neighboring element. An axial force of compression device 150 acting in an axial direction on frictional partner 140, 145 therefore depends on how many other frictional partners 140, 145 are present between it and compression device 150. Frictional partner 140, 145 at the greatest distance from compression device 150 experiences a significantly reduced axial force. This process is known as loss of axial force. If the average friction loss over all frictional partners 140, 145 exceeds a certain value, then a torque hysteresis which accompanies the loss of axial force can become so great that a satisfactory sensitive control of the torque transmissible by means of the clutch by compression device 150 is no longer possible. In addition, the loss of axial force can result in a reduction of the transmissible torque.

Clutch 100 depicted in FIG. 1 has first axial decoupling element 155 and second axial decoupling element 160. Both decoupling elements 155, 160 are set up to provide elastic decoupling, between input side 110 and outer basket 120, and output side 115 and inner basket 130, respectively, axially and, in addition, if necessary to transmit the torque of clutch 100 in a circumferential direction. This elastic decoupling allows frictional partners 140 and 145, when compressed, to move axially relative to input side 110 and output side 115. Compression device 150 acts on mutually opposing axial ends of the structure of frictional partners 140 and 145.

The dual axial separation of the structure of frictional partners 140, 145 from input side 110 or output side 115 results in a bilateral application of force from compression device 150 on the structure. As a result, a mean distance of frictional partners 140, 145 from a point of application of compression device 150 theoretically can be cut in half. Frictional partner 140 or 145, which is farthest away from compression device 150, is axially located in the middle of the structure of frictional partners 140, 145. If only input side 110 is decoupled then the loss of axial force can be reduced at least for outer basket 120. Similarly, if only output side 115 is decoupled then the loss of axial force can be reduced at least for inner basket 130.

Figure 2:
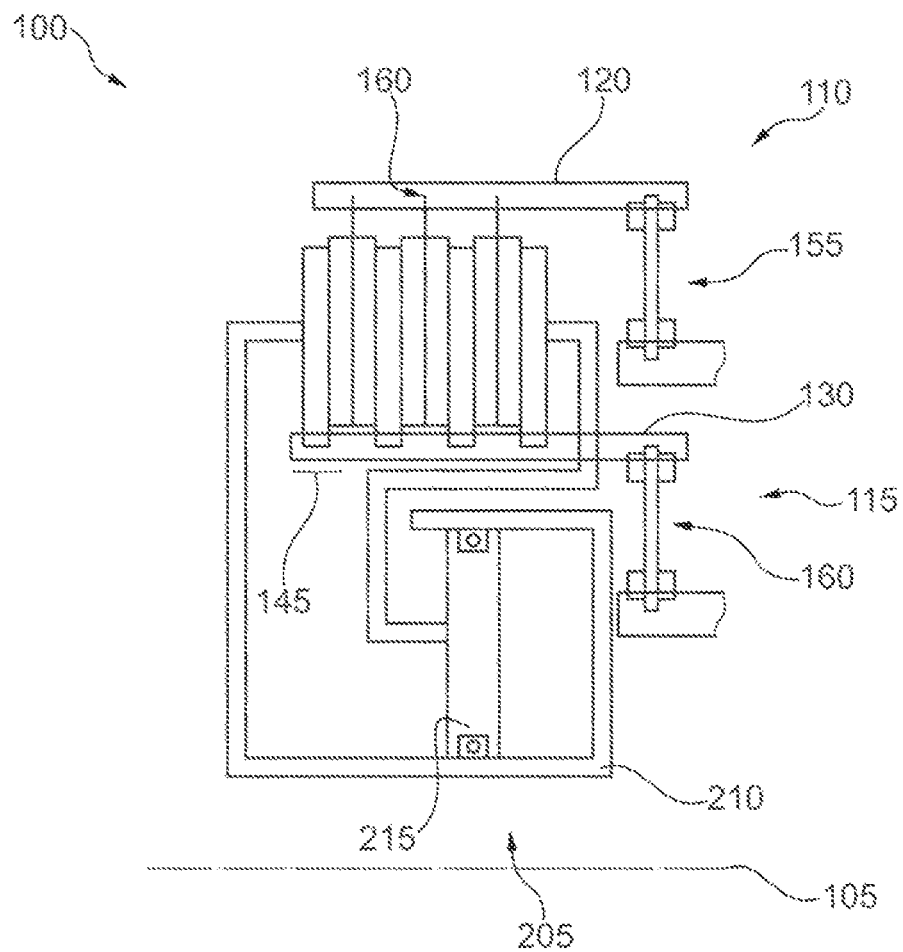
FIG. 2 is a schematic view of an exemplary embodiment of a clutch, according to the present invention.

FIG. 2 shows clutch 100 from FIG. 1 in another embodiment. Here too, input side 110 with outer basket 120 and output side 115 with inner basket 130 are disposed coaxially around axis of rotation 105. Axial decoupling elements 155 and 160 are realized as diaphragm springs. Both diaphragm springs 155, 160 have the form of a circular ring, with first diaphragm spring 155 radially on the outside engaged non-rotatably and axially fixed with outer basket 120, and radially on the inside with a section of the outer basket 120 of input side 110 which runs axially in the depiction in FIG. 2, where it is also non-rotatably attached and axially fixed. A corresponding arrangement applies to second diaphragm spring 160 on inner basket 130 of output side 115.

Compression device 150 is formed by hydraulic actuator 205. Hydraulic actuator 205 comprises cylinder 210 and axially movable piston 215 received therein. If the closed interior space of cylinder 210 formed by piston 215 is subjected to a fluid pressure, then cylinder 210 and piston 215 act on axially opposite ends of the structure of frictional partners 140 and 145, and compress the structure. A compression force of hydraulic actuator 205 is controllable by means of the pressure of the fluid.

In this embodiment, both outer basket 120 and inner basket 130 are free of axial forces which are exerted by hydraulic actuator 205. Decoupling elements 155, 160 can therefore be designed to be relatively soft. In a preferred embodiment, the elasticity of decoupling elements 155, 160 is significantly greater than that of frictional partners 140, 145, for example twice or five times as great.

Figure 3:
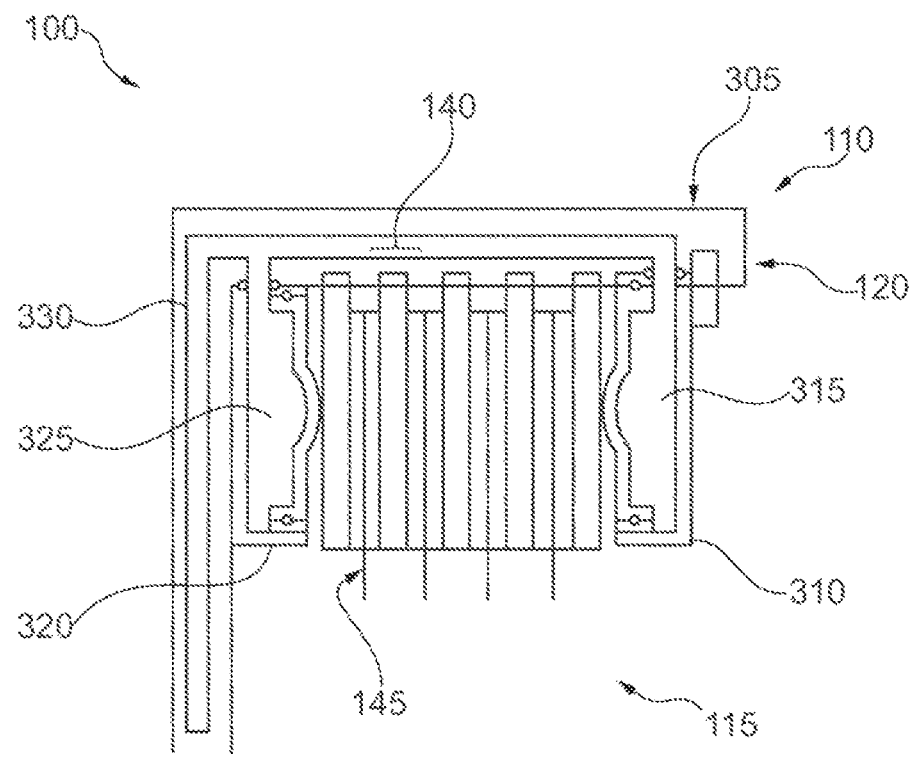
FIG. 3 is a schematic view of an exemplary embodiment of a clutch, according to the present invention; and, FIG. 4 is a diagram of forces on an exemplary embodiment of a clutch, according to the present invention.

FIG. 3 shows clutch 100 from FIG. 1 in still another embodiment. Not all of the elements that are shown in FIGS. 1 and 2 are also visible in FIG. 3. The statements made in regard to those figures also carry over in applying to the embodiment depicted in FIG. 3.

The structure of first frictional partners 140 and second frictional partners 145 is compressed axially here by compression device 150 in the form of hydraulic actuator 305. Hydraulic actuator 305 comprises first cylinder 310 with first piston 315 and second cylinder 320 with second piston 325. Cylinders 310 and 320 and pistons 315 and 325 are installed in such a way that when a fluid pressure is applied to hydraulic actuator 305 an axial compression of the structure of frictional partners 140 and 145 occurs. In an example embodiment, the volumes of fluid closed off by pistons 315 and 325 in cylinders 310 and 320 are connected with one another by means of duct 330. This makes a common fluid actuation of both pistons 315, 325 possible. It is also preferred that both pistons 315, 325 have the same effective cross section, so that the fluid pressure prevailing in cylinders 310, 320 results in equal forces on pistons 315, 325. In the preferred embodiment depicted the duct 330 runs through a radially running section of outer basket 120 of input side 115.

Figure 4:
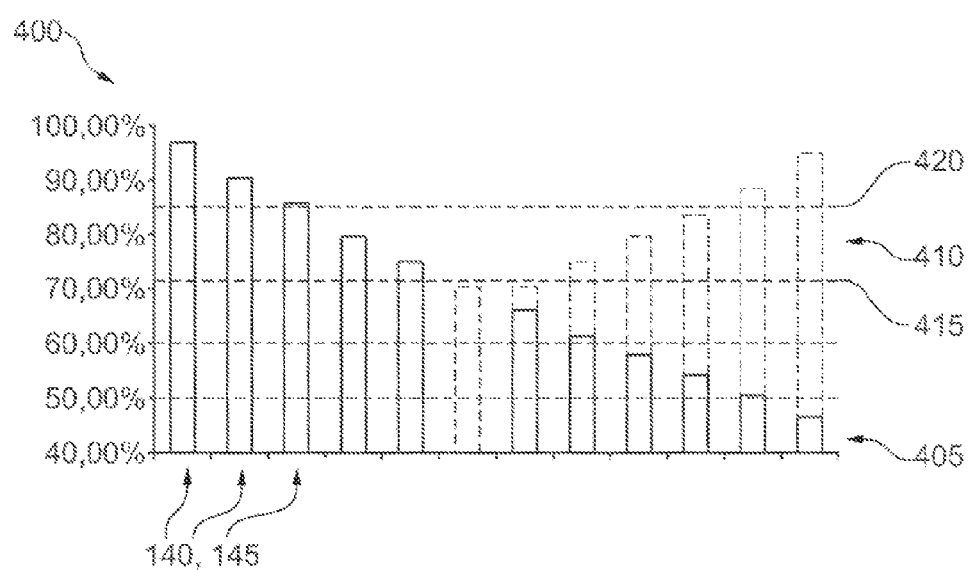

FIG. 4 shows diagram 400 of forces on one of clutches 100 of FIGS. 1 through 3. An axial force is plotted in the vertical direction as a percentage. Frictional partners 140 and 145 are plotted in a horizontal direction corresponding to their axial arrangement in clutch 100. First qualitative series 405 of columns shows the relative axial forces that act on individual frictional partners 140, 145 when an axially unilateral actuation of the structure of frictional partners 140, 145 occurs, as is usual in the existing art. In reference to the depiction in FIG. 4, the axial actuation takes place from the left; that is, frictional partner 140, 145 that is shown farthest to the right in diagram 400 is farthest away from compression device 150. Frictional partners 140, 145 located farthest to the right exhibit the lowest axial force and have a large maximum reduction of axial forces of approximately 52% (an approximate axial force of 98% reduced to 46%).

Second series 410 shows how the axial force develops over the axial position of frictional partners 140, 145 when one of the embodiments from FIGS. 1 through 3 is used for clutch 100. Since compression device 150 ultimately affects the structure of frictional partners 140, 145 on both the left and the right, frictional partners 140, 145 located in the middle of the arrangement exhibit the lowest axial force so that the maximum reduction of axial force is significantly lessened to approximately 29% (an approximate axial force of 98% reduced to 69%).

An average piston force 415 of approximately 71% corresponds to first series 405 for the depicted clutch. The difference between the average piston force 415 and 100% corresponds to the hysteresis present, which is approximately 29% in this example.

For second series 410, a second average piston force 420 is approximately 84%. So the allocated hysteresis is now only about 16%, which represents a reduction of the hysteresis of the clutch according to the existing art by approximately half.

Thus, it is seen that the objects of the present invention are efficiently obtained, although modifications and changes to the invention should be readily apparent to those having ordinary skill in the art, such modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

LIST OF REFERENCE CHARACTERS

100 Clutch
105 Axis of rotation
110 Input side
115 Output side
120 Outer basket
125 First radial bearing
130 Inner basket
135 Second radial bearing
140 First frictional partners
145 Second frictional partners
150 Compression device
155 First axial decoupling element
160 Second axial decoupling element
205 Hydraulic actuator
210 Cylinder
215 Piston
305 Hydraulic actuator
310 First cylinder
315 First piston
320 Second cylinder
325 Second piston 330 Duct
405 First series
410 Second series
415 First average piston force
420 Second average piston force

What is claimed is:

1. A clutch, comprising:
an input side, comprising:
   an input component;
   an outer basket; and,
   a first decoupling device having a first end fixedly secured to the input component and a second end fixedly secured to the outer basket;
an output side disposed rotatably to the input side, comprising:
   an output component;
   an inner basket; and,
   a second decoupling device having a first end fixedly secured to the output component and a second end fixedly secured to the inner basket;
first frictional partners axially movable and non-rotatably connected to the outer basket;
second frictional partners axially movable and non-rotatably connected to the inner basket; and,
a compression device arranged to compress the first and second frictional partners axially, providing a non-rotatable connection between the input side and the output side;
wherein, the first decoupling device is operatively arranged such that the outer basket is axially movable relative to the input component and the second decoupling device is operatively arranged such that the inner basket is axially movable relative to the output component.

2. The clutch as recited in claim 1, wherein the compressed first and second frictional partners are jointly movable axially relative to the input component and the output component.

3. The clutch as recited in claim 1, wherein the first decoupling device and the second decoupling device are axially elastic elements operatively arranged to transmit torque between the input side and the output side.

4. The clutch as recited in claim 3, wherein the axially elastic elements comprise a diaphragm spring.

5. The clutch as recited in claim 3, wherein the axially elastic elements have an elasticity such that, when the compression device axially compresses the first and second frictional partners, the outer basket and the inner basket are free of axial forces exerted by the compression device.

6. The clutch as recited in claim 1, further comprising a bearing operatively arranged such that the outer basket is axially moveable relative to the input component or the inner basket is axially movable relative to the output component.

7. The clutch as recited in claim 1, wherein the compression device comprises a hydraulic actuator operatively arranged to axially compress the first and second frictional partners.

8. The clutch as recited in claim 1, wherein the compression device comprises two hydraulic actuators operatively arranged antiparallel to axially compress the first and second frictional partners.

\* \* \* \* \*